Patented Jan. 23, 1923.

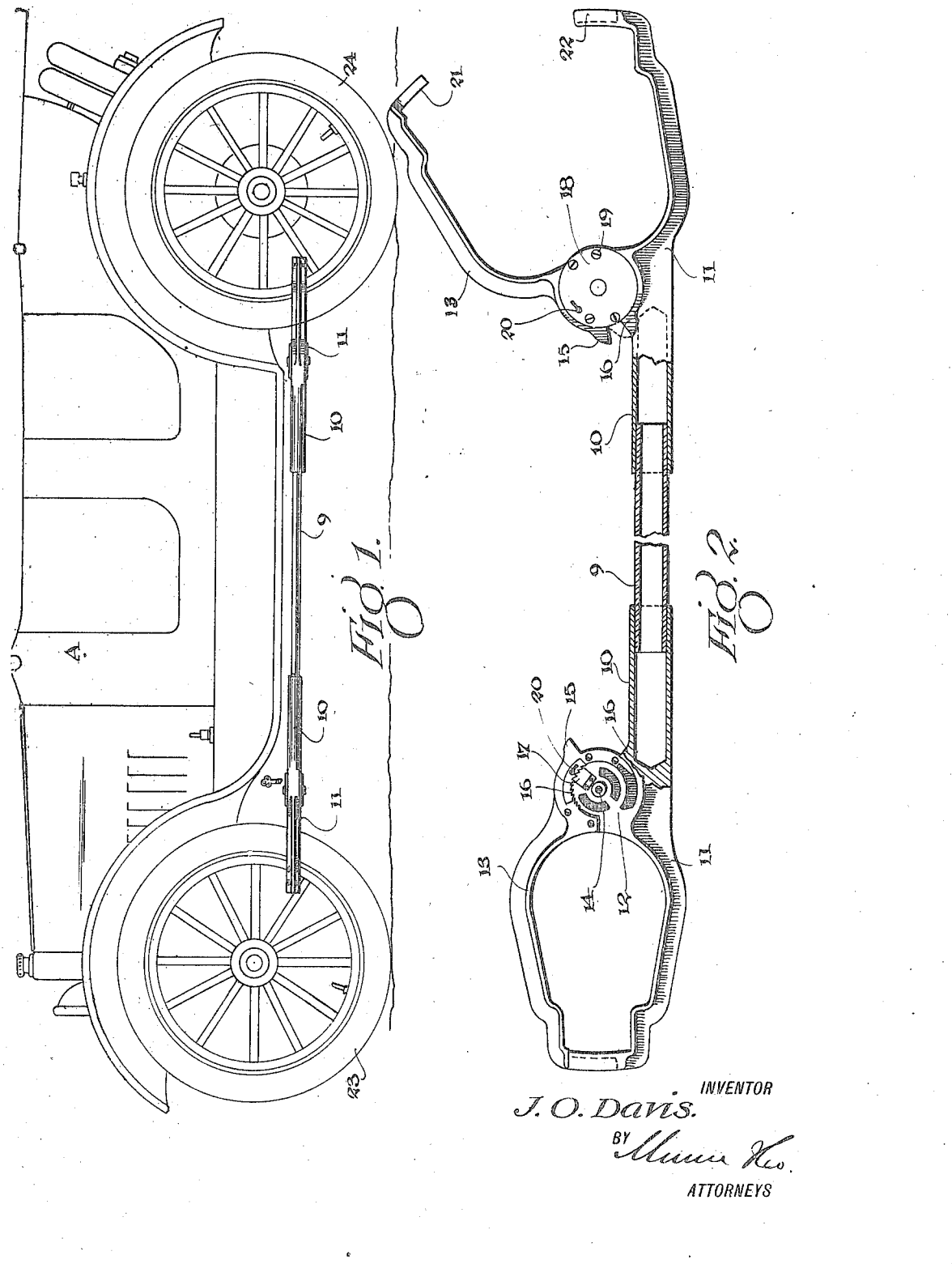

1,443,009

UNITED STATES PATENT OFFICE.

JOHN OSCAR DAVIS, OF TAOS, NEW MEXICO.

THEFT-PREVENTING DEVICE FOR AUTOMOBILES.

Application filed May 25, 1921. Serial No. 472,322.

*To all whom it may concern:*

Be it known that I, JOHN OSCAR DAVIS, a citizen of the United States, and a resident of Taos, in the county of Taos and State of New Mexico, have invented certain new and useful Improvements in Theft-Preventing Devices for Automobiles, of which the following is a specification.

This invention relates to a theft preventing device for automobiles.

The object of the invention is to provide a device adapted for locking together the front and rear wheel of an automobile, and thus rendering the automobile inoperative.

It is also an object of the invention that the device be adapted to be formed into a compact unit when not in use.

Other objects will hereinafter appear.

In carrying out the invention, it is contemplated to utilize a plurality of telescoping pipe sections each end section carrying on its outer end a pair of jaws adapted to encircle the rim and tire of an automobile wheel. The pipe sections are adapted to extend between the front and rear wheels of an automobile, and one of the jaws of each pair is pivoted for opening and closing, and a suitable lock is provided for holding the pivoted jaws against opening movement.

The invention is illustrated by way of example in the accompanying drawings, in which:

Figure 1 is a side elevation of an automobile showing my invention applied thereto, Figure 2 is a top plan view of the theft preventing device with parts broken away to more clearly illustrate the same.

Referring to the drawings more particularly, 9 indicates a pipe section, the ends of which are each telescoped by a pipe section 10. The outer ends of the pipe sections 10 are each formed with a stationary jaw 11, said jaw being preferably of the shape shown, and having its inner end formed with a circular enlargement 12. To each jaw 12 there is pivotally connected a complemental jaw 13 by the means of a pivot bolt as indicated at 14. The inner ends of the jaws 13 are semi-circular in shape, as shown, and upon the peripheral edge of each there is formed a lug 15 which is adapted to engage the surface 16 of the jaw 11 and limit the opening movement of the jaws 13.

A ratchet lock of conventional design is provided for holding the jaws 13 against opening movement and comprises a series of ratchet teeth 16' formed upon the semi-circular portion of the jaws 13 previously mentioned, and also the spring controlled pawl 17 which is carried by the stationary jaw 11. A circular plate 18 is also provided for covering the locking mechanism just described, and secured against removal upon the pivoted jaws 13 by the means of screws as indicated at 19. Also there is provided the usual key hole as indicated at 20 in which a key may be inserted for operating mechanism for tripping the pawl 17 when it is desired to unlock the jaws 13, and permit the same to be swung open. It also may be observed that the outer end of the pivoted jaws 13 is in the form of a finger 21 which is adapted to seat in a recess 22 formed in a similar finger on the stationary jaws 11, and thus when the two jaws are brought together, a complete closure of the outer ends thereof is made, and the fingers so overlapping that it would be difficult to engage the jaws in a manner for prying them apart. Referring to Figure 1, A indicates generally the body of an automobile, and 23 and 24 a front and rear wheel respectively, thereof.

In applying the present invention the pivoted jaws 13 are unlocked so that they may be swung open as illustrated in Figure 2, and the pipe sections 10 are drawn apart so that the jaws may be encircled about the tire and rim of the front and rear wheel of an automobile as clearly illustrated in Figure 1. A key may then be used for locking the jaws 13 against outward movement, and thus the front and rear wheels are rigidly secured together and locked against rotative movement. It may also be pointed out that when it is desired to remove the device it is only necessary to unlock the jaws 13 and then draw outwardly upon the stationary jaws 11 so that the same will assume a position where they will not engage with the rim or tire of the wheel when lifted away therefrom. The jaws 11 are moved toward each other as far as the pipe 9 will permit, and thus to a great extent shortening the length of the device and making it a very compact unit for storage in the automobile.

I claim:

1. A device of the character described, comprising two pair of jaws, one jaw of each pair being stationary, while the other jaw is pivoted for opening and closing with relation to the stationary jaw, telescopic pipe sections connecting said pairs of jaws, and locking means by which the pivoted jaw of each pair may be locked in its closed position with respect to the associated stationary jaw.

2. In a device of the character described, a plurality of telescoping pipe sections, a stationary jaw carried on the outer end of each end section, a jaw pivoted for opening and closing to each of the stationary jaws, and locking means for holding the pivoted jaws in a closed position with respect to the stationary jaws.

3. A locking device of the character described, comprising a plurality of extensible pipe sections, a pair of jaws carried upon the outer end of each end section, a jaw of each pair being stationary, while the other jaw is pivoted thereto for opening and closing, and locking means by which the pivoted jaws may be locked against opening with respect to the stationary jaws.

4. A locking device for motor vehicles, comprising a plurality of telescopic pipe sections adapted to extend between a front and rear wheel of a vehicle, and means carried upon the end sections for locking the front wheel and rear wheel together.

5. A locking device for motor vehicles, comprising a plurality of extensible and separable pipe sections adapted to be extended between a front and rear wheel of a vehicle, and means carried by the end pipe sections whereby the front and rear wheel may be locked together.

JOHN OSCAR DAVIS.